United States Patent
Karol et al.

(10) Patent No.: US 12,480,988 B2
(45) Date of Patent: Nov. 25, 2025

(54) SYSTEMS AND METHODS FOR SILICON CRACK DETECTION STRUCTURE

(71) Applicant: Apple Inc., Cupertino, CA (US)

(72) Inventors: David A. Karol, San Francisco, CA (US); Date J.W. Noorlag, Fremont, CA (US); Scott D. Hector, Austin, TX (US); Vasu P. Ganti, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 162 days.

(21) Appl. No.: 18/450,714

(22) Filed: Aug. 16, 2023

(65) Prior Publication Data

US 2024/0077531 A1 Mar. 7, 2024

Related U.S. Application Data (60) Provisional application No. 63/404,108, filed on Sep. 6, 2022.

(51) Int. Cl.
*G01R 31/28* (2006.01)

(52) U.S. Cl.
CPC ................. *G01R 31/2884* (2013.01)

(58) Field of Classification Search
CPC .............. G01R 31/2884; H01L 23/585; H01L 25/0657; H01L 22/12; H01L 22/34
USPC ..................... 324/750.3, 537, 500
See application file for complete search history.

(56) References Cited

U.S. PATENT DOCUMENTS

| | | | |
|---|---|---|---|
| 7,319,043 B2 | 1/2008 | Yang et al. | |
| 9,070,683 B2 | 6/2015 | Fender et al. | |
| 10,908,210 B2 | 2/2021 | Periyannan et al. | |
| 11,693,048 B2 | 7/2023 | Polomoff et al. | |
| 11,721,597 B2 | 8/2023 | Chen et al. | |
| 11,733,289 B2 | 8/2023 | Hu et al. | |
| 11,733,294 B2 | 8/2023 | Wang et al. | |
| 2020/0294869 A1* | 9/2020 | Jeong | H01L 22/32 |
| 2021/0074596 A1* | 3/2021 | Kim | H01L 23/544 |
| 2021/0384085 A1* | 12/2021 | Park | H01L 22/34 |
| 2023/0253271 A1* | 8/2023 | Blin | H01L 22/34 |
| | | | 257/48 |
| 2023/0317638 A1 | 10/2023 | Huang et al. | |
| 2024/0222205 A1* | 7/2024 | Jeon | H01L 23/585 |
| 2024/0258180 A1* | 8/2024 | Kwon | H01L 22/34 |

\* cited by examiner

*Primary Examiner* — Giovanni Astacio-Oquendo
(74) *Attorney, Agent, or Firm* — Fletcher Yoder, P.C.

(57) ABSTRACT

Systems and methods are provided for detecting defects caused by cracks in an integrated circuit, which may arise during or after a silicon wafer is singulated into separate integrated circuits. An integrated circuit may include crack detection circuitry including a metal circuit. The metal circuit may fracture or break due to crack propagation through a portion of the integrated circuit. In the event of a crack, testing may detect the fracture of the metal circuit. The crack detection circuitry may also detect accurate operation of circuitry of the integrated circuit.

29 Claims, 9 Drawing Sheets

SYSTEMS AND METHODS FOR SILICON CRACK DETECTION STRUCTURE

CROSS-REFERENCE TO RELATED APPLICATIONS

This application claims priority to U.S. Provisional Application No. 63/404,108, filed Sep. 6, 2022, entitled "SYSTEMS AND METHODS FOR SILICON CRACK DETECTION STRUCTURE," the disclosure of which is incorporated by reference in its entirety for all purposes.

BACKGROUND

This disclosure relates to systems and methods to detect defects in a semiconductor device such as cracking or delamination after a semiconductor wafer is singulated into separate integrated circuit dies.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Integrated circuits are found in a vast array of electronics devices, including computers, handheld devices, wearable devices, vehicles, robotics, and more. An integrated circuit may be formed by patterning circuits onto a silicon wafer in a fabrication process. At various stages of the fabrication process, layers of materials may be added or subtracted on the silicon wafer according to patterns defined by photolithographic masks. The resulting silicon wafer may include numerous individual integrated circuits that have been patterned and which are separated from one another by a scribe lane. To separate the integrated circuits into separate dies, the wafer may be singulated apart along the scribe lanes in a process referred to as "dicing." The dicing process applies force to the wafer as it is separated. This force can sometimes introduce defects (e.g., delaminations or cracks) that could extend beyond the scribe lanes and into the circuitry of the individual integrated circuits themselves. Although some integrated circuits may contain hard structures at their edges near the scribe lanes that are intended to block cracks, it is still possible that defects may break through during subsequent assembly handling or inside the finished end user product. When this happens, the integrated circuits may be damaged, impacting the functionality of the chip and reducing integrated circuit yield and reliability.

SUMMARY

A summary of certain embodiments disclosed herein is set forth below. It should be understood that these aspects are presented to provide the reader with a brief summary of these certain embodiments and that these aspects are not intended to limit the scope of this disclosure.

Certain detection structures and/or circuitry may be built into the integrated circuits to detect defects that may extend into and damage the integrated circuits. The detection circuitry may detect defects at the die edge, such as in die corners. Additionally, integrated circuits may include certain structures, such as a dummy metal pattern, that break due to a defect propagating through a portion of the structure. The dummy metal pattern may include staggered metal features in metal layers of the integrated circuit. The structure may be coupled to ground to enable the detection circuitry to detect a defect.

By breaking the structure, the detection circuitry may detect the defect during a test. For example, a signal (e.g., logical high) may be passed through the detection circuitry and the dummy metal pattern. If an output signal of the detection circuitry is low, the detection circuitry and dummy metal pattern may be coupled to ground with no defects (e.g., breaks) detected. However, if the output signal of the detection circuitry is high, the detection circuitry detects the defect due to a disconnection between the dummy metal pattern and ground.

Additionally or alternatively, the detection circuitry and/or structures may be included anywhere along the die edge. For example, the dummy metal pattern may be coupled to any input/output (I/O) circuitry at the die edge, such as general purpose I/O (GPIO) circuitry, dynamic random access memory (DRAM) I/O circuitry, and so forth, to detect cracks along the die edge.

BRIEF DESCRIPTION OF THE DRAWINGS

Various aspects of this disclosure may be better understood upon reading the following detailed description and upon reference to the drawings described below.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Figure 1:
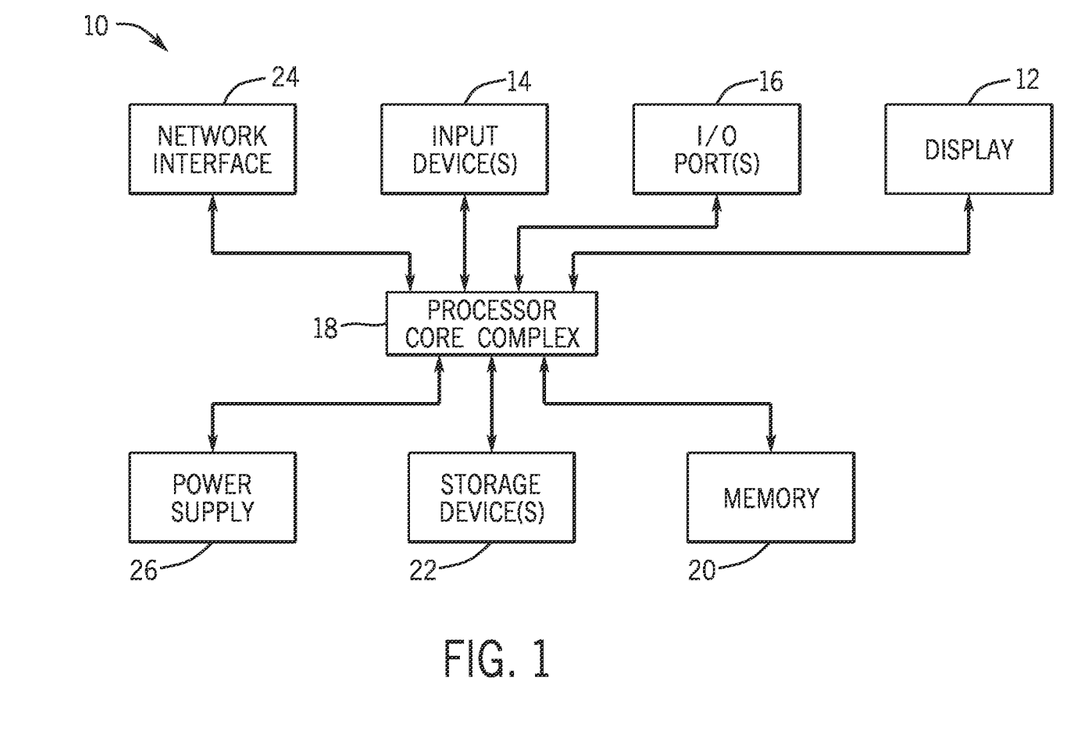
FIG. 1 is a schematic block diagram of an electronic device, in accordance with an embodiment.

An electronic device 10 that includes at least one integrated circuit is shown in FIG. 1. The electronic device 10 may include numerous components, such as those described below, that may include an integrated circuit that has been manufactured to include crack detection circuitry with a metal circuit. This may detect defects in the integrated circuit to protect functionality, yield and reliability.

As is described in more detail below, the electronic device 10 may be any suitable electronic device, such as a computer, a mobile phone, a portable media device, a tablet, a television, a virtual-reality headset, a wearable device such as a watch, a vehicle and/or vehicle dashboard, or the like. FIG. 1 is intended to represent one example of a particular implementation and is intended to illustrate the types of components that may be present in an electronic device 10.

The electronic device 10 of FIG. 1 includes an electronic display 12, one or more input devices 14, one or more input/output (I/O) ports 16, a processor core complex 18 having one or more processor(s) or processor cores, local memory 20, a main memory storage device 22, a network interface 24, and a power source 26 (e.g., power supply). The various components described in FIG. 1 may include hardware elements (e.g., circuitry), software elements (e.g., a tangible, non-transitory computer-readable medium storing executable instructions), or a combination of both hardware and software elements. It should be noted that the various depicted components may be combined into fewer components or separated into additional components. For example, the local memory 20 and the main memory storage device 22 may be included in a single component.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable gate arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network. The power source 26 may provide electrical power to one or more components in the electronic device 10, such as the processor core complex 18 or the electronic display 12. Thus, the power source 26 may include any suitable source of energy, such as a rechargeable lithium polymer (Li-poly) battery or an alternating current (AC) power converter. The I/O ports 16 may enable the electronic device 10 to interface with other electronic devices. For example, when a portable storage device is connected, the I/O port 16 may enable the processor core complex 18 to communicate data with the portable storage device.

The input devices 14 may enable user interaction with the electronic device 10, for example, by receiving user inputs via a button, a keyboard, a mouse, a trackpad, a touch sensing, or the like. The input device 14 may include touch-sensing components (e.g., touch control circuitry, touch sensing circuitry) in the electronic display 12. The touch sensing components may receive user inputs by detecting occurrence or position of an object touching the surface of the electronic display 12.

Figure 2:
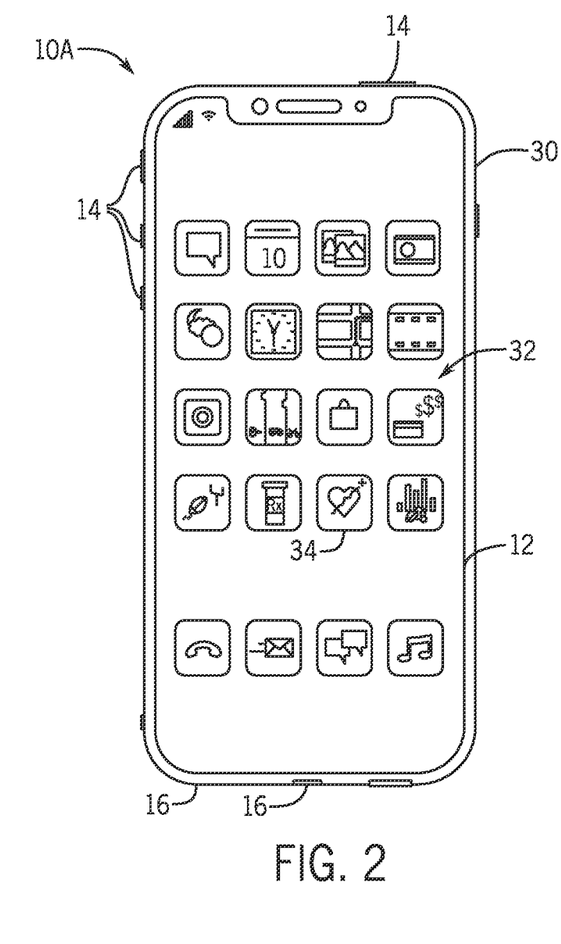
FIG. 2 is a front view of a mobile phone representing an example of the electronic device of FIG. 1, in accordance with an embodiment.

The electronic device 10 may take any suitable form. One example of the electronic device 10 in the form of a handheld device 10A is shown in FIG. 2. The handheld device 10A may be a portable phone, a media player, a personal data organizer, a handheld game platform, or the like. For illustrative purposes, the handheld device 10A may be a smart phone, such as any IPHONE® model available from Apple Inc.

The handheld device 10A includes an enclosure 30 (e.g., housing). The enclosure 30 may protect interior components from physical damage or shield them from electromagnetic interference, such as by surrounding the electronic display 12. The electronic display 12 may display a graphical user interface (GUI) 32 having an array of icons. When an icon 34 is selected either by an input device 14 or a touch-sensing component of the electronic display 12, an application program may launch.

The input devices 14 may be accessed through openings in the enclosure 30. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, or toggle between vibrate and ring modes.

Figure 3:
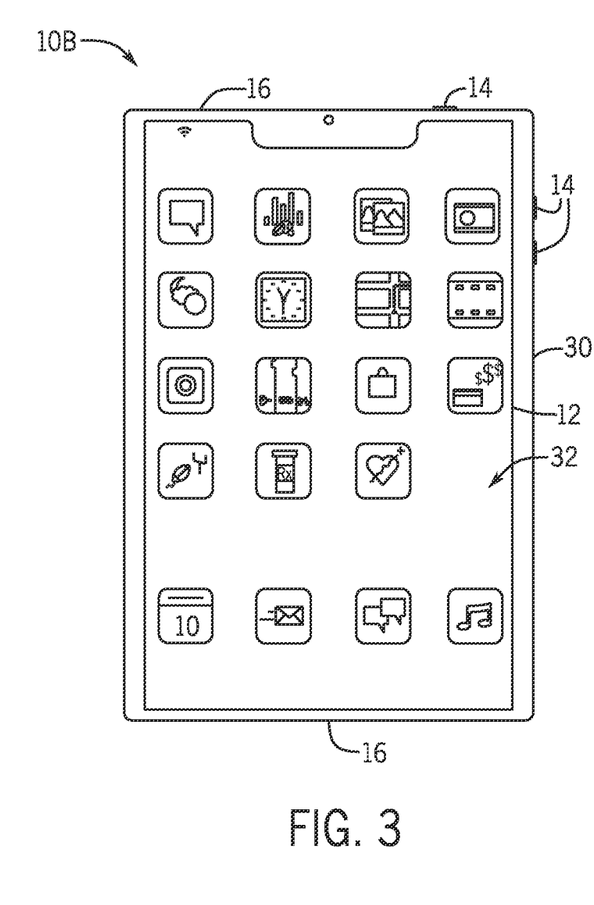
FIG. 3 is a front view of a tablet device representing an example of the electronic device of FIG. 1, in accordance with an embodiment.
Figure 4:
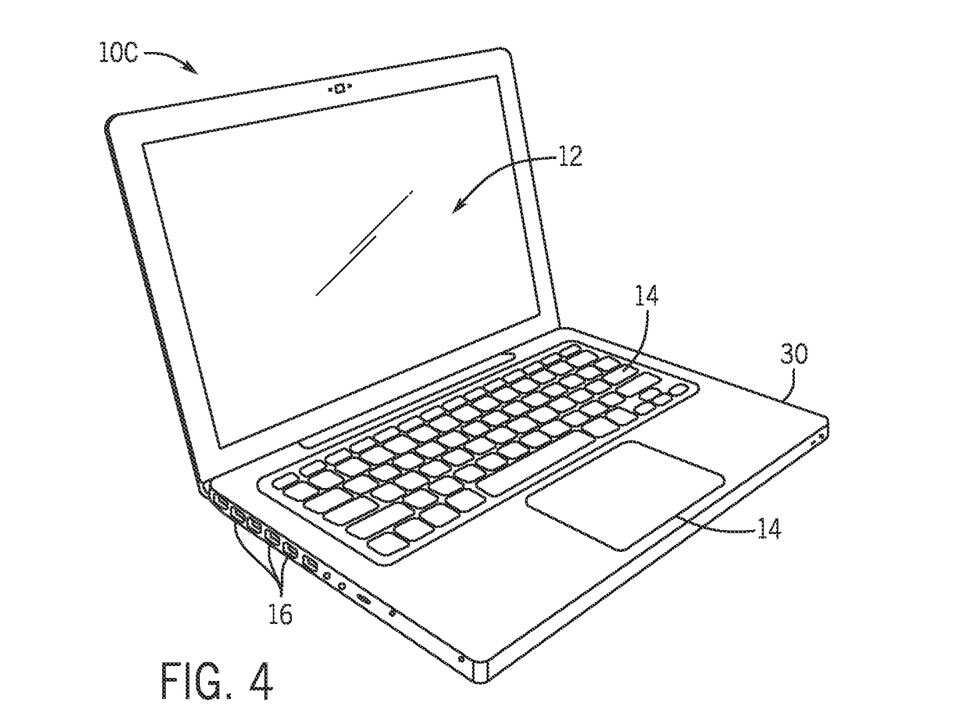
FIG. 4 is a front view of a notebook computer representing an example of the electronic device of FIG. 1, in accordance with an embodiment.
Figure 5:
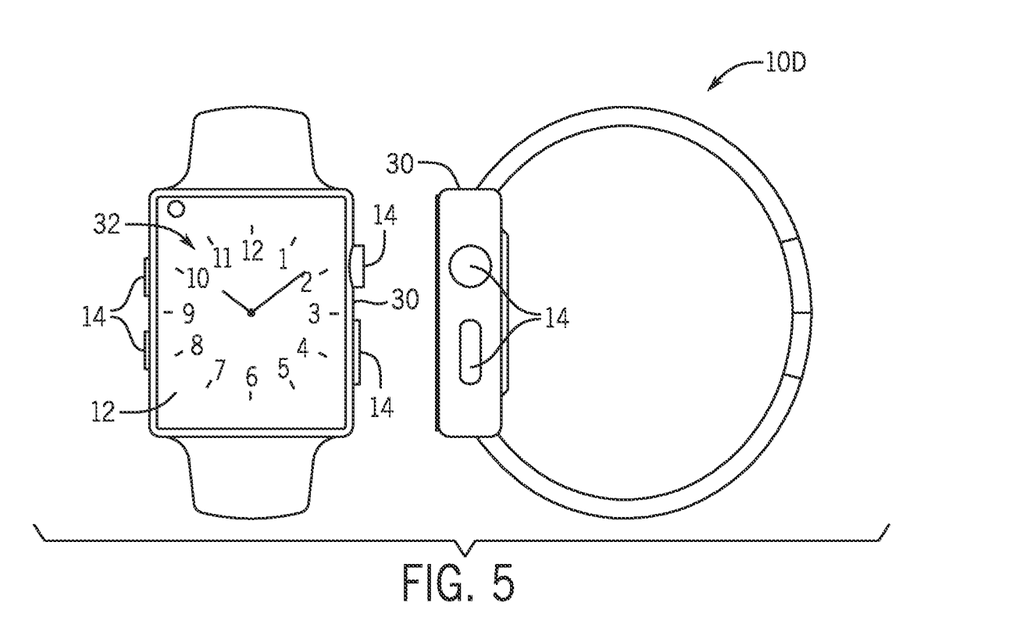
FIG. 5 are front and side views of a watch representing an example of the electronic device of FIG. 1, in accordance with an embodiment.

Another example of a suitable electronic device 10, specifically a tablet device 10B, is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MAC-BOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
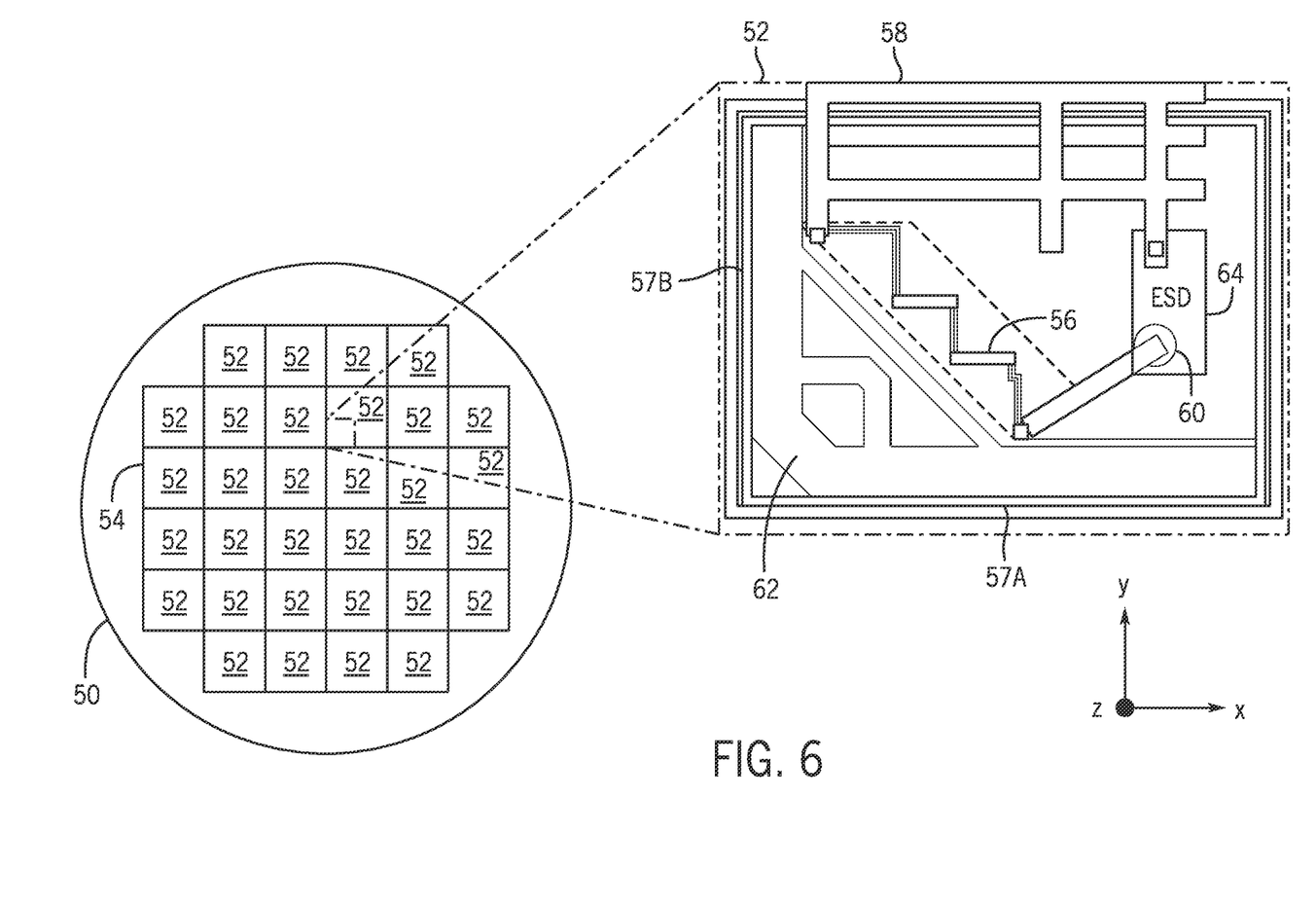
FIG. 6 is a schematic diagram of a silicon wafer including a number of integrated circuits, in accordance with an embodiment.

FIG. 6 illustrates a top view of an undiced silicon wafer 50 patterned with numerous individual integrated circuit areas 52 separated by scribe lanes 54. An (x, y, z) coordinate system illustrates a spatial arrangement of the elements of FIG. 6. There may be any suitable number of integrated circuit areas 52 taking any suitable arrangement. The illustration of FIG. 6 is schematic and is intended to illustrate the separation of the individual integrated circuit areas 52 by the scribe lanes 54. The act of separating the silicon wafer 50 to the individual integrated circuit areas 52 could sometimes result in initial cracks that could propagate toward the integrated circuit areas 52 in the following manufacturing processes. As used herein, the term "crack" may refer to any defect (e.g., cracks, fractures, delaminations) that could propagate during or after the singulation process. Accordingly, the integrated circuit areas 52 may include circuitry to detect cracks in the integrated circuit areas 52 that result from the singulation process, subsequent manufacturing and assembly, or in the field.

In a closer view showing the position of the integrated circuit area 52 on the silicon wafer 50, the integrated circuit area 52 may include any number of structures that facilitate detection of cracks in the integrated circuit area 52. The integrated circuit area 52 may include structures that form a dummy metal pattern 56. The dummy metal pattern 56 may provide a crack detection circuit. That is, cracks may propagate through a portion of the dummy metal pattern 56 and the dummy metal pattern 56 may break in response to crack propagation. In some embodiments, the dummy metal pattern 56 may be mechanically weaker than surrounding material. For example, the dummy metal pattern 56 may be formed to have a lower fracture toughness (K1C) and/or modulus than adjacent material. As such, the cracks may propagate through the dummy metal pattern 56 and may break or fracture a portion of the dummy metal pattern 56 with a high likelihood. In certain embodiments, the integrated circuit area 52 may include any number of dummy metal patterns 56. Additionally, the dummy metal patterns 56 may be coupled end-to-end. In some embodiments, one or more first dummy metal patterns 56 may be oriented in a first direction having a plane of the dummy metal pattern 56 substantially parallel with a first side 57A of the integrated circuit area 52. Additionally or alternatively, one or more second dummy metal patterns 56 may be oriented in a second direction having a plane of the dummy metal pattern 56 substantially parallel with a second side 57B of the integrated circuit area 52. As such, the first dummy metal pattern 56 may be oriented substantially perpendicular to the second dummy metal pattern 56.

The dummy metal pattern 56 may be coupled to ground 58 at a first end. Additionally, the dummy metal pattern 56 may be coupled to a bump 60 at a second end. During testing, a probe may be placed at the bump 60 to determine a resistance and/or voltage through the dummy metal pattern 56 and determine whether any breaks or fractures are present in the dummy metal pattern 56. For example, by measuring a low voltage (e.g., 0 volts) and/or low resistance at the bump 60, the crack detection circuit may indicate a fixed connection to ground 58 and that the dummy metal pattern 56 is intact. If a high voltage and/or high resistance is measured at the bump 60, the crack detection circuit may indicate the presence of a crack or break in the dummy metal pattern 56.

In certain embodiments, the integrated circuit area 52 may include additional structures to block cracks and protect the active die area. For example, the additional structures may dissipate fracture energy and/or direct the propagation of cracks away from the active die area. However, certain defects may break through and may be detected by crack detection circuitry. A seal ring 62 may dissipate fracture energy and reduce propagation of cracks into the integrated circuit area 52 to block cracks from reaching the active area. Moreover, cracks may propagate underneath the seal ring 62 and may avoid the crack detection circuitry. In certain embodiments, the integrated circuit area 52 may include structures disposed beneath the crack detection circuitry that direct the crack to propagate towards the seal ring 62 and/or the crack detection circuitry. The structures may have a higher fracture toughness and/or modulus than portions of the crack detection circuitry 72. As such, the structures may encourage the crack to propagate through the crack detection circuitry 72 with a high likelihood. The integrated circuit area 52 may also include an electrostatic discharge (ESD) protection circuit 64 that may reduce the effects of ESD on circuitry of the integrated circuit area 52.

In some embodiments, wafer 50 may refer to a reconstituted wafer, and integrated circuit area 52 may represent an integrated circuit chip that was fabricated on a silicon wafer distinct from wafer 50. In some embodiments, a reconstituted wafer 50 may include one or more known good die (KGD), where one or more of integrated circuit areas 52 may represent a known good die diced and selected from another wafer distinct from reconstituted wafer 50. In some embodiments, one or more of the redistribution layers of a respective integrated circuit area 52 on a reconstituted wafer 50 may be fabricated on the reconstituted wafer 50.

While all of these structures are shown in FIG. 6, it should be appreciated that some embodiments may include more or fewer structures and/or circuitry. The purpose of these structures and/or circuitry is to detect crack propagation in the integrated circuit area 52.

Figure 7:
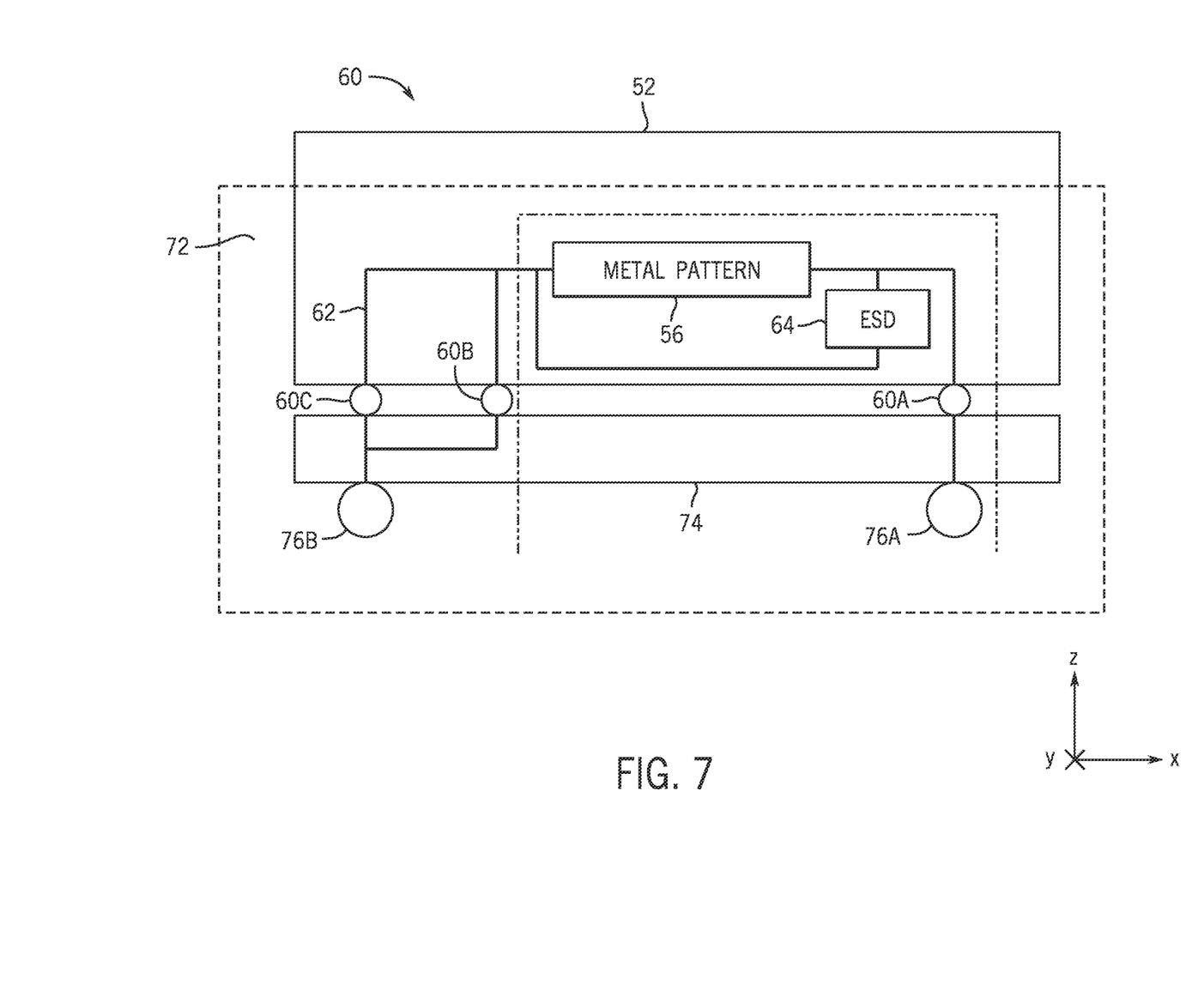
FIG. 7 is a schematic cross-sectional view of the silicon wafer of FIG. 6 across a die edge including crack detection circuitry, in accordance with an embodiment.

Examples of these structures are shown in FIG. 7, which represents a side view of the integrated circuit area 52. It should be appreciated that the integrated circuit area 52 may also include other circuitry, such as test circuitry. The integrated circuit area 52 may include structures and/or circuitry that assist in detection of cracks in the integrated circuit area 52. Crack detection circuitry 72 may detect crack propagation through the integrated circuit area 52. The crack detection circuitry 72 may include any number of structures that may break or fracture based on a crack in the integrated circuit area 52. As such, the crack detection circuitry 72 may be tested by passing a signal through the crack detection circuitry 72 and measuring the output. The crack detection circuitry 72 may indicate an open circuit condition when at least a portion of the crack detection circuitry 72 is fractured.

Additionally or alternatively, the crack detection circuitry 72 may indicate a closed circuit condition when the crack detection circuitry 72 is not fractured.

The integrated circuit area 52 may include the crack detection circuitry 72 that includes the dummy metal pattern 56. The dummy metal pattern 56 may be coupled to a package 74 via bumps 60 (referred to individually as bumps 60A, 60B, 60C). A first end of the dummy metal pattern 56 may be coupled to the package 74 via a first bump 60A. A second end of the dummy metal pattern 56 may be coupled to ground 58. The second end of the dummy metal pattern 56 may also be coupled to the package 74 via bumps 60B, 60C.

The crack detection circuitry 72 may generate an output signal and output the signal at the output ball 76A. For example, test circuitry connected to the output ball 76A may measure a voltage and/or a resistance of the crack detection circuitry 72. Due to the low resistance and/or high conductivity of the dummy metal pattern 56, a low resistance may be expected at the output ball 76A. If a break or fracture exists in the dummy metal pattern 56, the output signal may provide a high resistance measurement at the output ball 76A. As such, the output signal of the crack detection circuitry 72 may differ from an expected signal. Additionally or alternatively, an input signal may be provided to the crack detection circuitry 72 via an input ball 76B. If the dummy metal pattern 56 is intact, the input signal may pass through the crack detection circuitry 72 and may be accurately sensed as an output signal at the output ball 76A. If the dummy metal pattern 56 includes a fracture or break, the output signal at the output ball 76A may differ from the input signal. For example, a high voltage signal (e.g., 1 volts) provided as the input signal may not propagate through the crack detection circuitry 72. Accordingly, the output signal at the output ball 76A may be a low voltage signal (e.g., 0 volts) due to the fracture or break in the dummy metal pattern 56.

Figure 8:
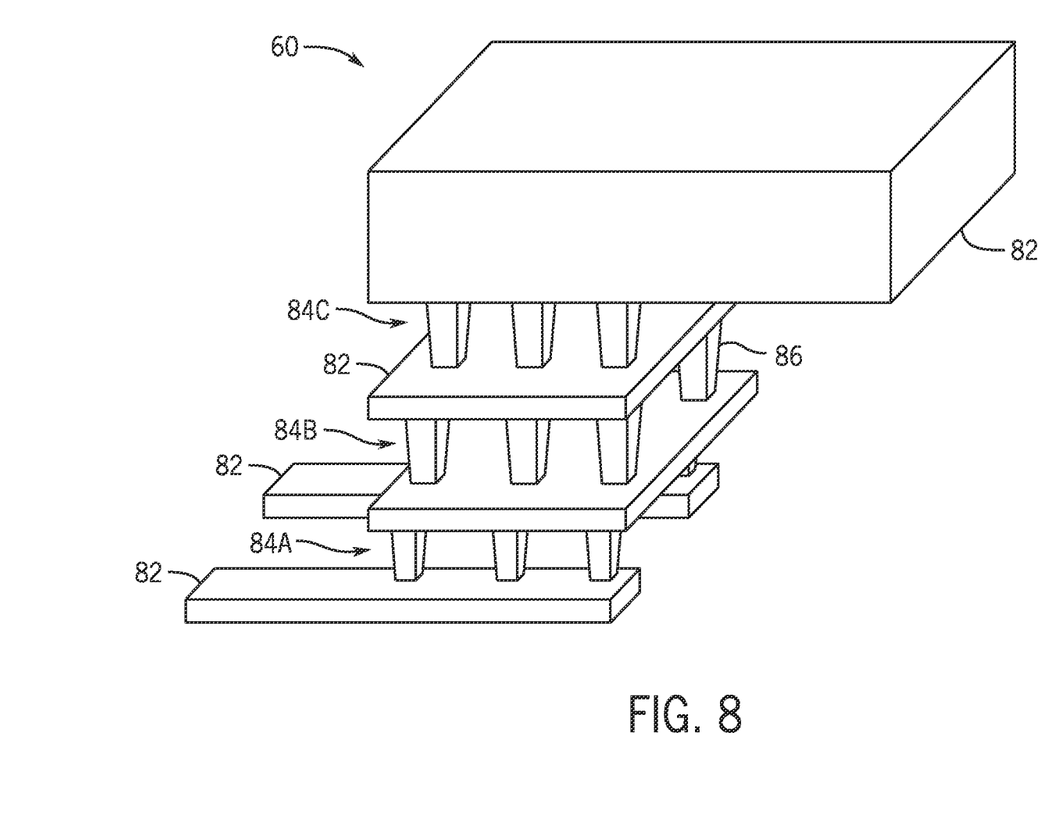
FIG. 8 is a perspective view of the silicon wafer of FIG. 6 including metal layers, in accordance with an embodiment.

With the foregoing in mind, FIG. 8 illustrates a schematic diagram of a number of layers of the wafer 50, in accordance with an embodiment of the present disclosure. The examples used in this disclosure describe metal layers 82 and via layers 84 (referred to individually as via layers 84A, 84B, 84C) that include four metal layers 82 and three via layers 84. These layers include various metal structures, such as any number of dummy metal patterns 56, that may be connected by vias or via pillars 86. However, there may be any suitable number of metal layers 82 and via layers 84 (e.g., 1, 2, 4, 5, 8, 12, 16, 20, 24, or more metal and via layers). The dummy metal patterns 56, including via pillars 86, may be staggered throughout the metal layers 82 and via layers 84 at the edge of the integrated circuit area 52. As a result, cracks that may form during die singulation or in processes after die singulation may propagate through the dummy metal patterns 56, causing a break or fracture in the dummy metal patterns 56 that may be detected with the crack detection circuitry 72. The via pillars 86 may be formed to have a lower fracture toughness (K1C) and/or modulus than adjacent material, such as the metal layers 82. Accordingly, cracks may propagate through the via pillars 86 of the dummy metal pattern 56 and the crack detection circuitry 72 may detect the fracture or break in one or more of the via pillars 86. In certain embodiments, the via pillars 86 may fracture before the metal layers 82 due to the lower fracture toughness and/or modulus.

The purpose of these structures is to detect possible cracks in the integrated circuit area 52. Additionally or alternatively, there may be many more layers than those shown in the schematic diagram of FIG. 8; it should be appreciated that the illustrated layers are intended to represent the type of layers that may be used. For example, the integrated circuit area 52 may include a substrate, a redistribution layer, a passivation layer, a sacrificial layer, and so forth. In certain embodiments, cracks may form in any of the layers of the integrated circuit area 52 and/or any number of the layers of the integrated circuit area 52. The crack detection circuitry 72 may detect the formation of a crack in any such layers and may be at least partially disposed in any such layers.

Figure 9:
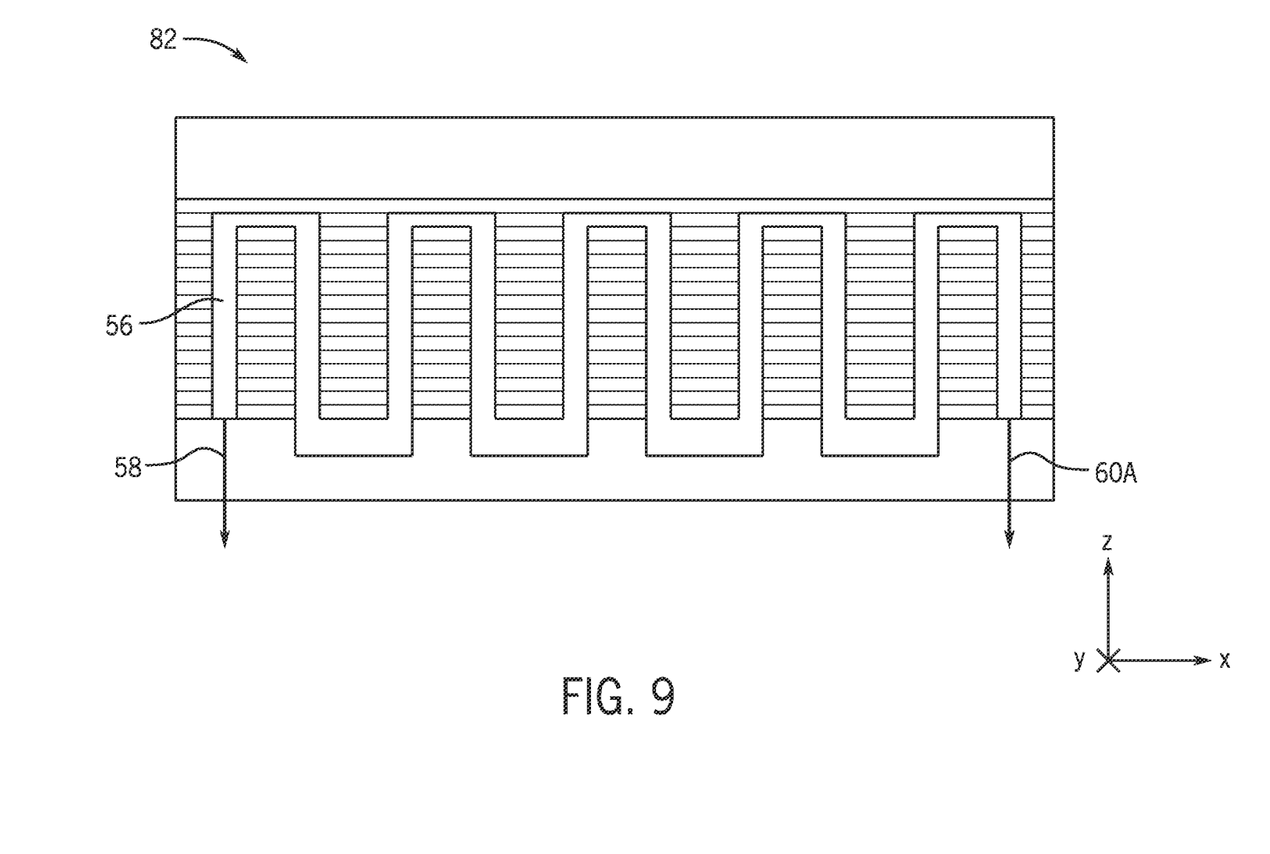
FIG. 9 is a side view of a dummy metal pattern formed in the silicon wafer of FIG. 6, in accordance with an embodiment.

Continuing to FIG. 9, a side view of the metal layers 82 including the dummy metal pattern 56, in accordance with an embodiment of the present disclosure. The dummy metal pattern 56 may be at least partially disposed in the metal layer 82 and may connect to additional dummy metal patterns 56 in adjacent metal layers 82 via the via pillars 86. In certain embodiments, the dummy metal pattern 56 may extend through any number of metal layers 82. As such, the dummy metal pattern 56 may be at least partially disposed in any number of metal layers 82. A first end of the dummy metal pattern 56 may be coupled to ground 58 and a second end of the dummy metal pattern 56 may be coupled to the first bump 60A.

Figure 10:
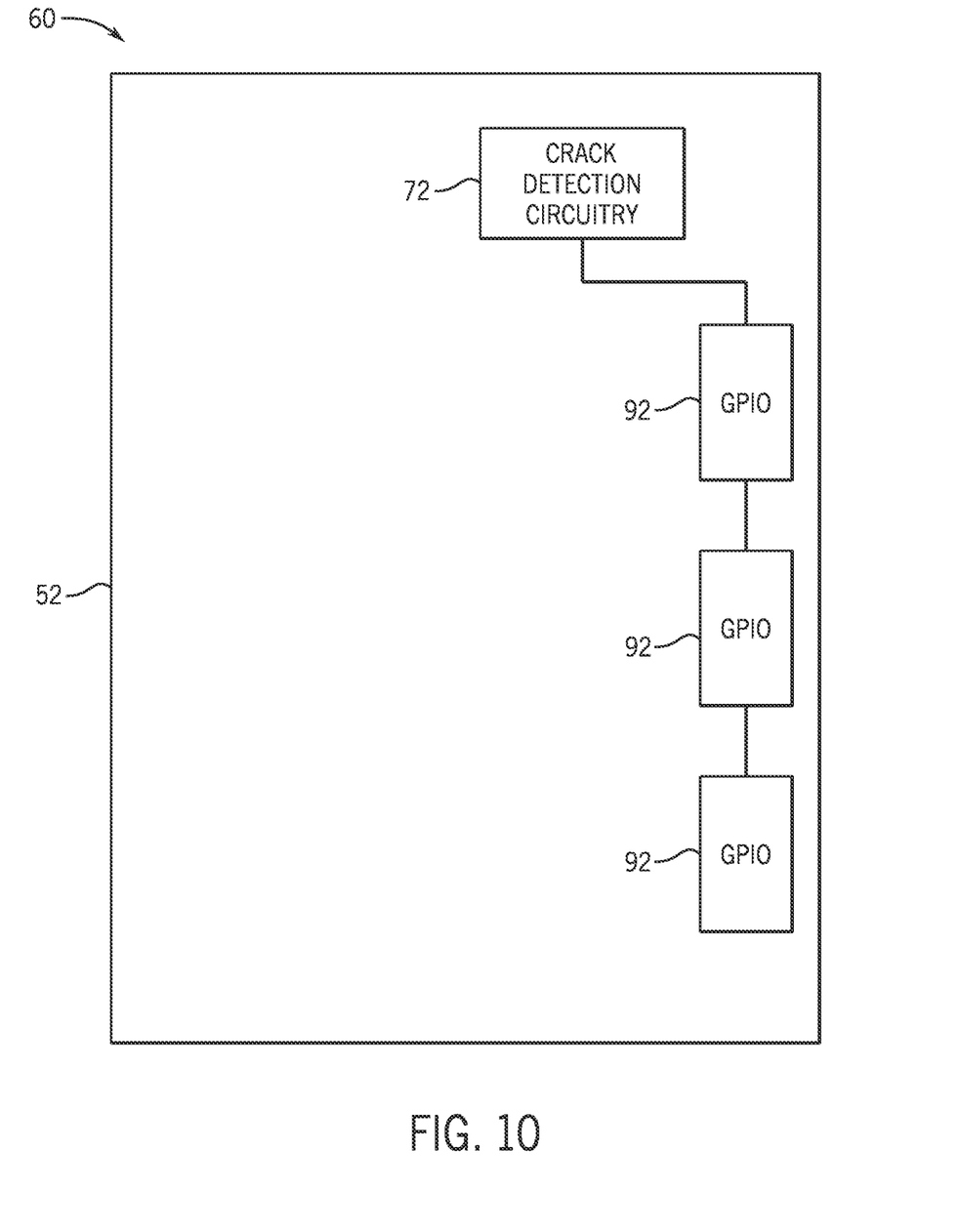
FIG. 10 is a schematic diagram of input/output circuitry utilizing the crack detection circuitry of FIG. 7, in accordance with an embodiment.

With the foregoing in mind, FIG. 10 illustrates a schematic diagram of the crack detection circuitry 72 connected to a number of general purpose I/O (GPIO) circuits 92, in accordance with an embodiment of the present disclosure. The GPIO circuits may be coupled together, such as in series. The GPIO circuits 92 may be disposed adjacent an edge of the integrated circuit area 52. The GPIO circuits 92 may perform a boundary scan test by passing any number of 0 or 1 signals through the GPIO circuits 92 to test operation of the GPIO circuits 92. The GPIO circuits 92 may be coupled to the crack detection circuitry 72. The crack detection circuitry 72 may generate an output signal and may transmit the output signal to one or more of the GPIO circuits 92. The GPIO circuits 92 may receive the output signal as an input and may pass the output signal along the chain of GPIO circuits 92 to test circuitry that may be coupled to one or more of the GPIO circuits 92. The test circuitry may measure the output signal to determine whether a crack is present in the crack detection circuitry 72. In some embodiments, a multiplexer may select the output signal of the crack detection circuitry 72 or a boundary scan signal as input to the GPIO circuits 92. Accordingly, the multiplexer may select the output signal of the crack detection circuitry 72 when detecting for cracks in the integrated circuit area 52. Alternatively, the multiplexer may select the boundary scan signal as input to the GPIO circuits 92 when testing the operation of the GPIO circuits 92.

While the example in FIG. 10 describes three GPIO circuits 92, any number of GPIO circuits may be included in the integrated circuit area 52. Additionally, while the examples used in this disclosure describe GPIO circuits 92, the crack detection circuitry 72 may utilize any suitable I/O circuitry, such as DRAM I/O circuitry.

Figure 11:
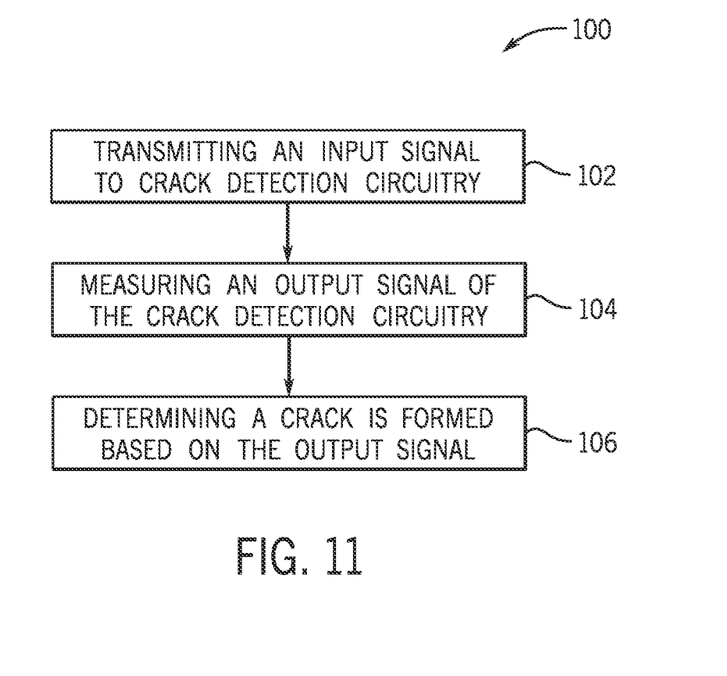
FIG. 11 is a flowchart of a method for detecting cracks in an integrated circuit using the crack detection circuitry of FIG. 7, in accordance with an embodiment.

FIG. 11 illustrates a flowchart of a method 100 for detecting cracks in the integrated circuit area 52 using the crack detection circuitry 72, in accordance with an embodiment. While the blocks of the method 100 are described in a particular order, the blocks may take place in any other suitable order. Testing the integrated circuit area 52 for cracks may begin by transmitting an input signal to the crack detection circuitry 72 (block 102). The crack detection circuitry 72 may receive the input signal and the input signal may pass through the crack detection circuitry 72 to an output terminal, such as the output ball 76A. An output signal of the crack detection circuitry 72 may be measured (block 104). The output signal may be utilized to determine a crack is formed (block 106). In certain embodiments, the input signal and the output signal may differ. For example, the input signal may include a high signal and the output signal may include a low signal. Additionally or alternatively, the input signal may indicate a low resistance and the output signal may indicate a high resistance. As such, the crack detection circuitry 72 may indicate the formation of a crack in the integrated circuit area 52.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

Moreover, techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. Integrated circuitry comprising:
    a metal layer; and
    crack detection circuitry disposed at least partially in the metal layer, wherein the crack detection circuitry is configured to:
        indicate an open circuit condition when at least a portion of the crack detection circuitry is fractured; and
        indicate a closed circuit condition when the crack detection circuitry is not fractured.

2. The integrated circuitry of claim 1, wherein the crack detection circuitry comprises at least one via pillar.

3. The integrated circuitry of claim 2, wherein the at least one via pillar has a fracture toughness or modulus less than a fracture toughness or modulus of the metal layer.

4. The integrated circuitry of claim 2, wherein the at least one via pillar is configured to fracture before the metal layer in an event that a crack forms.

5. The integrated circuitry of claim 4, wherein the crack detection circuitry comprises a plurality of metal layers and a plurality of via layers.

6. The integrated circuitry of claim 5, wherein the crack detection circuitry comprises a metal circuit at least partially disposed in the plurality of metal layers.

7. The integrated circuitry of claim 6, wherein the metal circuit is at least partially disposed in the plurality of via layers.

8. The integrated circuitry of claim 6, wherein the plurality of via layers comprise at least one via pillar disposed adjacent a die edge.

9. The integrated circuitry of claim 1, comprising a second metal layer, wherein the crack detection circuitry is disposed at least partially in the second metal layer.

10. The integrated circuitry of claim 1, comprising second crack detection circuitry configured to:
    indicate the open circuit condition when at least a portion of the second crack detection circuitry is fractured; and
    indicate the closed circuit condition when the second crack detection circuitry is not fractured.

11. The integrated circuitry of claim 1, comprising a seal ring configured to dissipate fracture energy associated with a crack in the integrated circuitry.

12. The integrated circuitry of claim 11, comprising a structure disposed beneath the crack detection circuitry, wherein the structure is configured to guide a crack formed beneath the seal ring towards the crack detection circuitry.

13. The integrated circuitry of claim 12, wherein the structure is configured to guide the crack towards a via layer of the crack detection circuitry.

14. The integrated circuitry of claim 1, wherein the crack detection circuitry is disposed at a corner of the integrated circuitry.

15. The integrated circuitry of claim 1, wherein the crack detection circuitry is located at an edge of the integrated circuitry.

16. An integrated circuit comprising:
    an input configured to receive an input signal;
    an output configured to output an output signal; and
    crack detection circuitry configured to receive the input signal and provide an output signal indicative of whether a crack is formed in the integrated circuit.

17. The integrated circuit of claim 16, wherein the crack detection circuitry is configured to provide the output signal as:
    the input signal based on the crack detection circuitry not being fractured; and
    a different signal other than the input signal based on the crack detection circuitry being fractured.

18. The integrated circuit of claim 16, wherein the crack detection circuitry is configured to provide the output signal as:
    an open-circuit condition based on the crack detection circuitry being fractured; and
    a closed-circuit condition based on the crack detection circuitry not being fractured.

19. Integrated circuitry comprising:
    input/output (I/O) circuitry; and
    crack detection circuitry coupled to the I/O circuitry, wherein the crack detection circuitry is configured to fracture with a high likelihood in an event that a crack forms in the integrated circuitry.

20. The integrated circuitry of claim 19, wherein the I/O circuitry is configured to receive an output signal from the crack detection circuitry.

21. The integrated circuitry of claim 19, wherein the I/O circuitry comprises a plurality of I/O circuits coupled in series.

22. The integrated circuitry of claim 19, wherein the I/O circuitry comprises at least one of general purpose I/O circuitry or dynamic random access memory (DRAM) I/O circuitry.

23. The integrated circuitry of claim 19, wherein the crack detection circuitry is configured to fracture with the high likelihood in the event that the crack forms at a corner of the integrated circuitry.

24. The integrated circuitry of claim 19, wherein the crack detection circuitry is configured to fracture with the high likelihood in the event that the crack forms at an edge of the integrated circuitry.

25. The integrated circuitry of claim 19, wherein the crack detection circuitry is configured to fracture with the high likelihood in the event that the crack forms in a substrate of the integrated circuitry.

26. The integrated circuitry of claim 19, wherein the crack detection circuitry is configured to fracture with the high likelihood in the event that the crack forms in a metal layer of the integrated circuitry.

27. The integrated circuitry of claim 19, wherein the crack detection circuitry is configured to fracture with the high likelihood in the event that the crack forms in a plurality of metal layers of the integrated circuitry.

28. The integrated circuitry of claim 19, comprising:
 a first metal layer; and
 a second metal layer disposed below the first metal layer, wherein the crack detection circuitry is configured to fracture with the high likelihood in the event that the crack forms in the first metal layer of the integrated circuitry.

29. The integrated circuitry of claim 19, wherein the crack detection circuitry is configured to fracture with the high likelihood in the event that the crack forms in a redistribution layer of the integrated circuitry.

\* \* \* \* \*